Oct. 9, 1923.
A. G. SLATER
1,470,494
DIRECTION INDICATOR
Filed Sept. 26, 1921   3 Sheets-Sheet 1
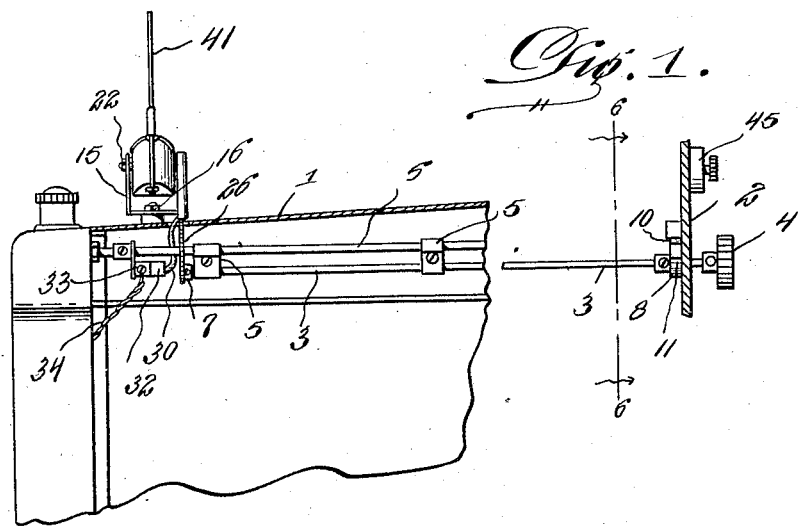
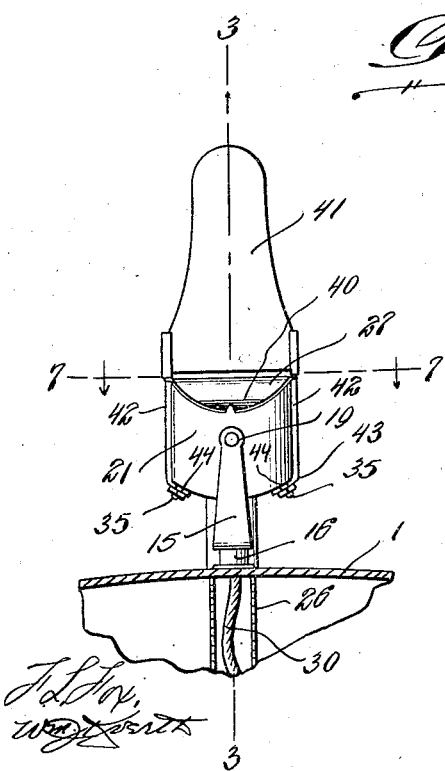
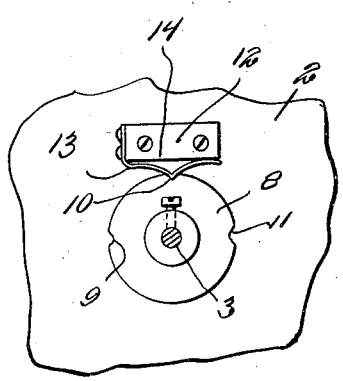
A. G. Slater, INVENTOR
BY Victor J. Evans, ATTORNEY
WITNESS:

Oct. 9, 1923.
A. G. SLATER
1,470,494
DIRECTION INDICATOR
Filed Sept. 26, 1921
3 Sheets-Sheet 2
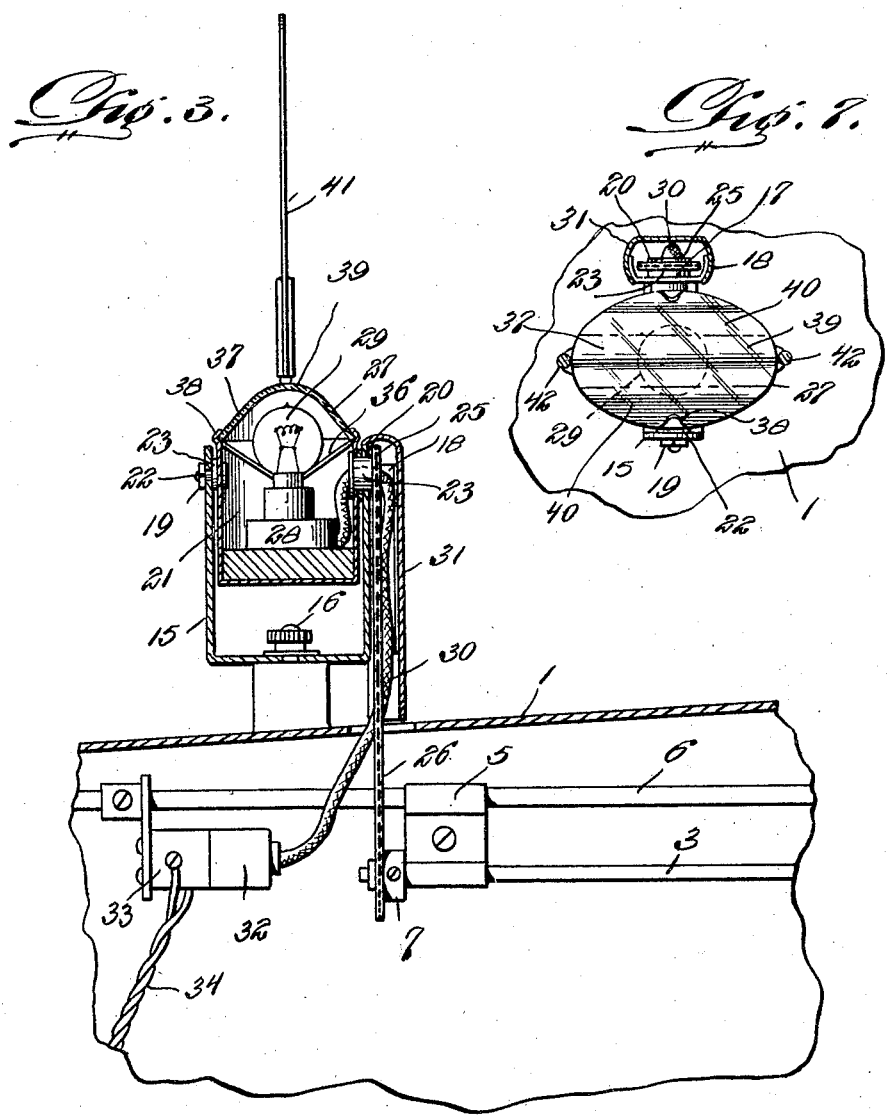
WITNESS:
A. G. Slater,
INVENTOR
BY Victor J. Evans
ATTORNEY

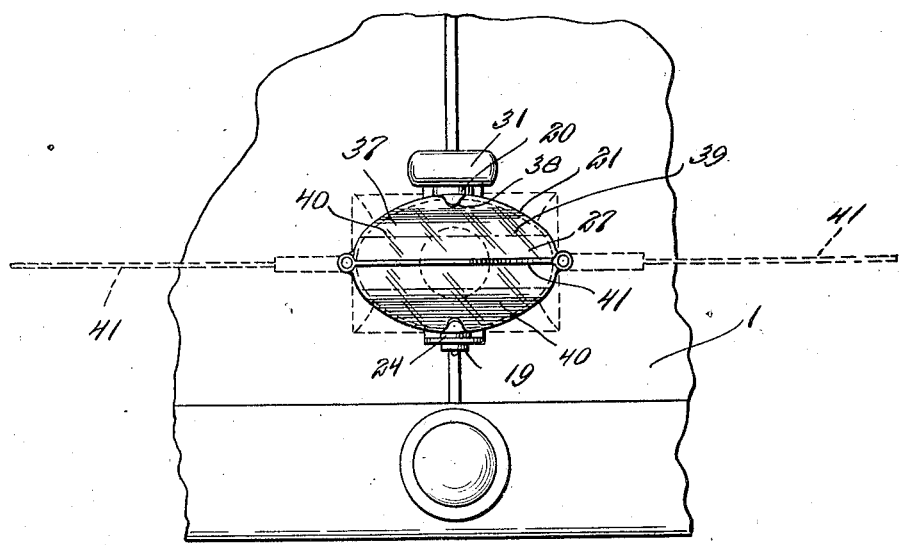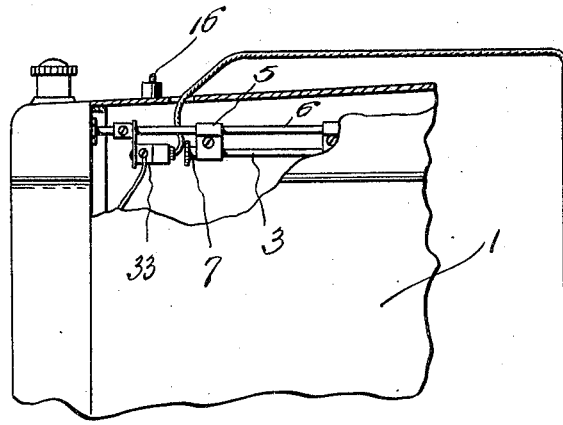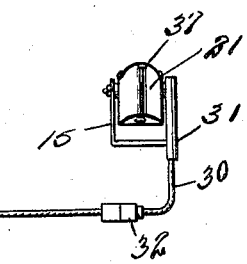

Patented Oct. 9, 1923.

1,470,494

UNITED STATES PATENT OFFICE.

ALBERT G. SLATER, OF MILES CITY, MONTANA.

DIRECTION INDICATOR.

Application filed September 26, 1921. Serial No. 503,230.

*To all whom it may concern:*

Be it known that I, ALBERT G. SLATER, a citizen of the United States, residing at Miles City, in the county of Custer and State of Montana, have invented new and useful Improvements in Direction Indicators, of which the following is a specification.

My present invention has reference to a direction signal for automobiles.

My object is to arrange over the hood, or if desired, on the filler spout for the radiator of an automobile a signal which is in normal vertical non-signalling position and which is operable from the dash forward of the driver's seat to turn the same laterally toward the right or left hand side of the machine, and when so turned to direct rays of light therefrom so that warning will be given to vehicles either approaching or following the machine on which the device is attached with respect to the direction of travel to be taken by the machine in the dark, the signal, of course, being apparent without illumination in daylight.

It is a further object to produce a direction signal for automobiles which shall be illuminated in night driving and which will direct rays of light to either side of the machine, whereby the driver will observe road conditions to the side of his machine and steer the same accordingly, while at the same time vehicles approaching the machine will be notified of the exact position of the machine on the road and the direction which it is to travel, should it be found necessary or desirable to make a turn on the road.

A still further object is to produce a direction signal that is visible in both daylight and night time, and is particularly devised to warn vehicles approaching the machine upon which the device is installed of the intention of the driver of the machine to turn or of the position of the machine on the road, and which may be installed over the hood of the engine in such a manner as to not interfere with the raising or lowering of the hood or, if desired, the removal of the hood from the engine.

It is a still further object to produce a signal of this character which can be detached from its support and employed as a trouble lamp.

It is a still further object to produce a direction signal which shall be of a simple construction, may be cheaply manufactured and marketed, easily installed upon an automobile, and thoroughly efficient for the purpose for which it is devised.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of a portion of an automobile illustrating the application of the improvement thereon.

Figure 2 is a front elevation thereof.

Figure 3 is a sectional view on the line 3—3 of Figure 2.

Figure 4 is a plan view with parts broken away and parts in section and showing by the dotted lines the signal swung laterally toward each side of the machine.

Figure 5 is a side elevation illustrating the manner in which the device may be employed as a trouble lamp.

Figure 6 is a sectional view on the line 6—6 of Figure 1 looking in the direction of the arrows.

Figure 7 is a sectional view on the line 7—7 of Figure 2.

The remaining figures illustrate details.

Referring now to the drawings in detail, the numeral 1 designates a portion of an ordinary automobile.

My direction indicator may be placed on the hood rib or on the radiator cap of the machine in a position whereby the same will not interfere with the raising or removal of the hood when desired.

Passing through a suitable opening in the hood 2 of the automobile 1 is a shaft 3. The shaft has on its inner end an operating knob 4 and finds bearings in clips 5 that are supported from the rod 6 between the radiator and the dash. The outer and free end of the shaft 3 has secured thereon a sprocket wheel 7, and the said shaft, adjacent to its inner end has secured thereon a wheel 8 provided with three equi-distantly spaced notches 9, 10 and 11 respectively. Each of these notches is designed to receive therein a catch 12 formed on one end of an arched spring 13, the said spring being secured in the concaved face of a block 14 which is connected to the outer face of the dash 3. By this arrangement, it will be seen that the shaft can be turned to three different positions and retained in either of said positions. The catch 12 is of such construction as to readily ratchet out of the notches when the knob 4 is turned, but is also such as to prevent the turning of the shaft unless the knob is operated.

The improvement contemplates the employment of a substantially U-shaped bail 15. This bail is centrally, but removably secured, by means 16 either to the radiator filler cap, to the top of the radiator or to the hood bracket of the machine. One of the arms, 17 of the bail 15 has its edges inturned, as at 18, providing the outer face of the said arm with an open pocket. The inturned portions or flanges 18 terminate away from the top of the arms 17, and both arms of the bail are provided with openings for the reception of pivot means 19 and 20 respectively. The pivots 19 and 20 are formed on the sides of a casing 21 which may have its bottom portion weighted so that the same will assume a vertical position on the bail. In addition to this, the weight of the elements in the casing, hereinafter described, will have a tendency to retain the same in the said vertical position, but still further, the casing is normally retained vertical by mechanism connected between the same and the shaft 3, as will presently be apparent. The pivot 19 is of the ordinary construction, but preferably has its outer end threaded and engaged by a nut 22. The pivot 20, however, is in the nature of a tubular member or sleeve 23, and the bore of the sleeve communicates with the interior of the casing. Between the arms of the casing and the pivots 19 and 20 there are suitable washers 24, and the sleeve providing the pivot 23 has either integrally formed therewith or secured on the outer end thereof a sprocket wheel 25. Around this sprocket wheel there is trained a chain 26 that is directed through the open pocket provided on the outer face of the arm 17 of the bail 15, the said chain 26 being also trained around the sprocket 7 on the shaft 3.

By the arrangement as above described, it will be apparent that by turning the knob 4 to cause the catch 12 on the shaft 3 to engage in say the notch 9, the casing 21 will be swung transversely to bring its front end 27 toward one of the sides of the machine 1. By turning the knob to bring the catch 12 into the notch 10, the casing will be returned to and held in its normal vertical position, and by turning the knob to bring the catch 12 into the notch 11, the casing 21 will be swung transversely of the casing in an opposite direction to that as set forth.

The casing has its open front 27 concaved or rounded inwardly from the ends to the center of the sides thereof, and in the casing there is seated a socket 28 for an electric bulb 29, suitable conductors 30 leading from the socket and passing through the sleeve 23 are directed between the flanges 18 of the arm 17 of the bail 15. The open face pocket, the sprocket chain 25, and the conductors 30 are normally covered by a cap or shield 31 comprising a flanged member that is slidable over the flanged edges 18 of the arm 17 of the bail. The conductors 30 have their ends secured to contacts on a plug 32, and the said plug is let in a socket 33 which is connected by conductors 34 to the source of electricity for the automobile 1, and in this manner, it will be noted that the casing and the elements connected therewith, when the securing means for the bail 15 are removed may be carried in the hand of the operator and an additional conductor having a plug secured to the socket 34, the other end of the additional conductor having a socket to receive the plug 32, and in this manner the improvement may be employed as a trouble lamp.

The means which secure the socket in the casing are preferably in the nature of screws 35 which have their heads upon the outer and convex end of the casing 21. In the casing there is a concaved reflector 36 for the bulb 30, and in the concaved open face or end of the casing there is a cross sectionally rounded lens plate 37. The plate 37 has its sides rounded downwardly from its ends, and on the sides and on the ends at the open face or end of the casing there are catch elements 38 respectively that engage with the lens plate for holding the same in a position to close the casing. The lens plate has its central portion transparent, as at 39, and the sides thereof, opposite the said transparent portion 39 translucent, as at 40. These translucent portions are provided by staining or otherwise coloring the lens plate so that the rays of light deflected from the bulb therethrough will be of a red, blue or other hue as desired by the user of the device.

The director blade or arm is indicated by the numeral 41, the same being preferably in the nature of a flat plate which may be concaved from its inner end toward its outer end and its last mentioned end rounded. At its inner edges, there are secured on the blade 41 arms 42. Each arm has its end rounded inwardly, as at 43, the said portions 43 being flattened and widened and each being provided with a notch 44, these notched portions designed to receive therein the screws 35 and to be contacted by the heads of the said screws, when the screws are driven home.

The flow of current through the conductor 33 is controlled by a switch 45 arranged on the dash 2 of the automobile 1. In day driving, the switch is off, but in night driving, the switch is on so that the bulb 30 is ignited. When the casing and its signal arm are in normal vertical inactive position the rays of light will be directed upwardly on the opposite sides of the blade 41, and a vehicle ahead will be thus warned of the approach of the automobile 1. When the automobile 1 is to turn to either the right or the left, the knob for the shaft 3 is operated as above described. The rays of light will be thus directed to the sides of the machine and not only serve as a warning to an approaching machine or a machine in close proximity at the rear of the automobile 1 the course of direction to be taken by the said automobile, but such rays being directed to the sides of the road permit the driver to observe conditions thereon, and thus avoid driving his machine into depressions or gulleys when another machine is approaching the automobile.

When employed as a trouble lamp, the blade is detached from the casing. The rays of light passing through the translucent portions of the lens tend to direct the light rays against the sides of the blade and are directed by the blade to the sides of the car so that while the light is brilliant, it is not dazzling to the eyes of the driver of the automobile or to the eyes of the driver of an approaching vehicle. The rays will be directed a considerable distance to the sides of the automobile, and therefore are clearly perceptible to vehicles to the rear of the machine as well as those approaching the machine.

From the foregoing description, when taken in connection with the drawings, it will be seen that I have produced a comparatively simple, inexpensive and thoroughly efficient direction signal which may be also employed with equal efficiency as a trouble lamp, and while I have described and shown a satisfactory embodiment of the improvement as it now appears to me I may, at a later date, make changes therefrom, and therefore it is to be understood that I am not to be limited to the construction disclosed but am entitled to all such changes therefrom as fall within the scope of what is claimed.

Having described the invention, I claim:—

A device of the character described comprising a yoke removably secured to an automobile, a lamp carrying casing journalled on the arms of the yoke and having an outer concaved face, a reflector in the casing, a cross sectionally rounded lens closing the open face of the casing and having a central transparent portion and end translucent portions, a blade slidably mounted on the casing and projecting centrally from the lens, a shaft journalled below the hood and having an operating end received through the dash of the automobile, means between the shaft and lamp casing for causing the turning of the casing from a vertical to lateral positions when the shaft is turned, and spring means latching the shaft against turning when the casing and blade are in either vertical or lateral positions.

In testimony whereof I affix my signature.

ALBERT G. SLATER.